United States Patent [19]

Charlton

[11] Patent Number: 5,775,746
[45] Date of Patent: Jul. 7, 1998

[54] RETRACTABLE DOOR STOP SECURITY DEVICE/UTILITY BOX

[76] Inventor: John Charlton. 581 Middleside Road Route 3. Amherstburg. Ontario, Canada, N9V 3R3

[21] Appl. No.: 639,107

[22] Filed: Apr. 18, 1996

Related U.S. Application Data

[63] Continuation of Ser. No. 263,042, Jun. 21, 1994, abandoned.
[51] Int. Cl.[6] ............................................. E05C 3/12
[52] U.S. Cl. .............................. 292/219; 292/DIG. 15; 292/342
[58] Field of Search ........................... 292/219, 342, 292/DIG. 15, 222, 336, 333

[56] References Cited

U.S. PATENT DOCUMENTS

| 110,985 | 1/1871 | Lugrin | 292/DIG. 15 X |
|---|---|---|---|
| 1,297,189 | 3/1919 | Lawler | 292/342 |
| 1,895,146 | 1/1933 | Brown | 292/228 |
| 3,656,787 | 4/1972 | Coopersmith | 292/DIG. 15 X |
| 3,805,322 | 4/1974 | Serrano | |
| 3,833,963 | 9/1974 | Waters | 292/DIG. 15 X |
| 3,989,286 | 11/1976 | Cleff | 292/DIG. 15 X |
| 4,462,623 | 7/1984 | Grant | |
| 4,501,444 | 2/1985 | Dominquez | 292/342 |
| 4,601,502 | 7/1986 | Van Dyke | |
| 4,601,504 | 7/1986 | Wolf | |
| 4,797,970 | 1/1989 | Charlton | 292/DIG. 15 X |

*Primary Examiner*—Rodney M. Lindsey
*Assistant Examiner*—Monica E. Millner
*Attorney, Agent, or Firm*—Dykema Gossett

[57] ABSTRACT

A retractable flush-mounted apparatus which is mounted in a floor or other flat mounting surface. The apparatus includes a housing with a flange plate which is mounted in an opening in the mounting surface. A retractable member is provided within the housing which alternates between a raise position and a lower position. By pressing downwardly on the top of the retractable member, a latching mechanism is released, allowing the spring biased retractable member to move to the raised position. The retractable member is lowered by applying a force sufficient to counteract the action of the spring and move the member into the housing, whereupon the latch mechanism re-engages the retractable member to retain it in the lower position. The apparatus can be adapted for use as a security door stop or as a pop-up utility outlet. When used as a security door stop, the risk of accidental lock-out is reduced through the use of a ratchet plate and camming surface.

12 Claims, 3 Drawing Sheets

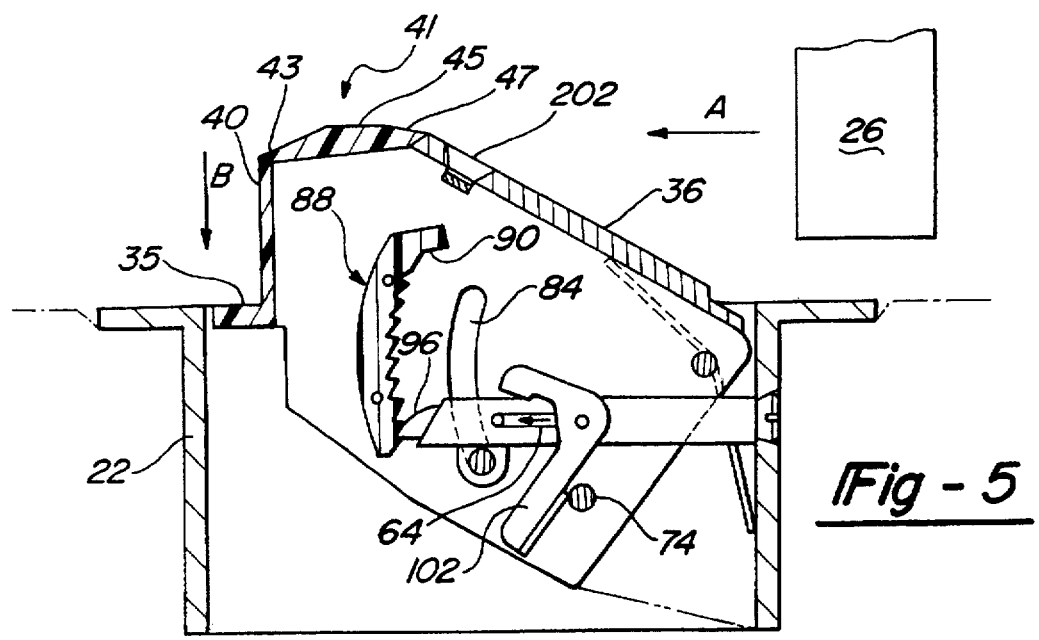
Fig-5
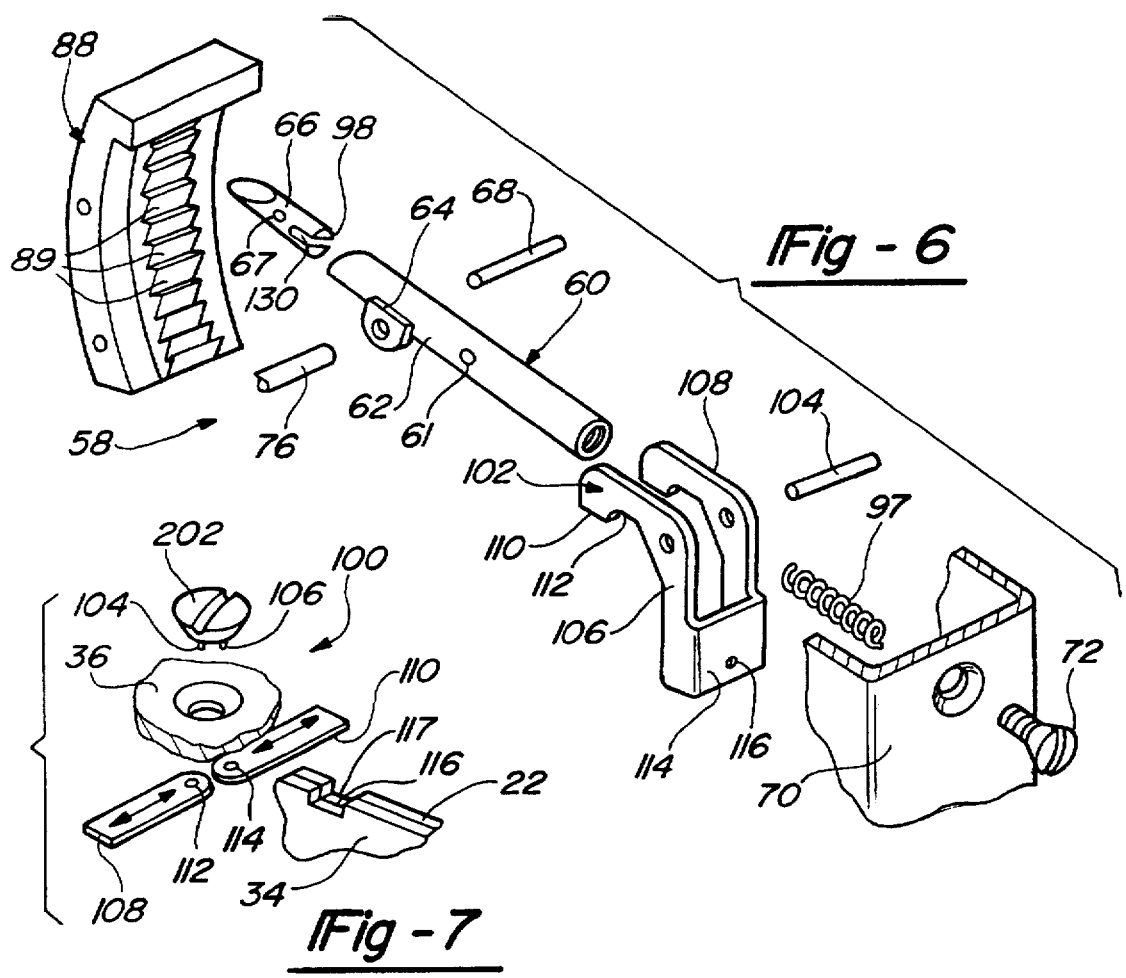
Fig-6
Fig-7

RETRACTABLE DOOR STOP SECURITY DEVICE/UTILITY BOX

This application is a continuation of application Ser. No. 08/263,042 filed on Jun. 21, 1994, now abandoned.

FIELD OF THE INVENTION

The present invention relates generally to retractable floor or wall mounted devices which move between a raised position and a lowered position. More specifically, the present invention is directed to hideaway door stops and utility outlets.

BACKGROUND OF THE INVENTION

In U.S. Pat. No. 4,797,970 which issued Jan. 17, 1989, the entire disclosure of which is incorporated herein by reference, the present inventor discloses a foot operated security device having a retractable security stop member.

It is known that affordable security devices are in great demand by homeowners, particularly in large metropolitan areas. Each year literally millions of burglaries occur in North America alone. Approximately one-fourth of all crime index offenses are burglaries. Two out of three burglaries are residential.

In order to protect life and property, a number of anti-burglary devices have been developed by others in the past. These include alarms and silent intrusion detection devices which are devised to alert building occupants to an unauthorized entry into the premises. However, alarms do little to protect against forcible entry, although they may occasionally thwart a burglary by frightening an intruder.

A more practical method of preventing unwanted intrusion by a burglar is to provide intrusion-resistant premises. This is commonly achieved to varying degrees of success by conventional locks such as dead bolt assemblies in doors and windows. Other devices such as "charley bars" have provided some additional fortification of doors, although there usefulness is limited and they are generally inconvenient to implement.

Of particular concern are those intruders that gain entry by first knocking or ringing a door bell, only to force themselves into the premises when the lawful occupant unlocks the door to determine who is calling. To prevent such entry, door "peepholes" which may include wide angle lenses or the like have been provided to allow an occupant to visually inspect and verify the identity of the caller. Unfortunately, doors which are strong enough to withstand attempted forceful entry are often insulative to sound which makes it difficult to interrogate an unrecognized intruder to determine the nature of the call. To this end, security chains have been developed by which a limited clearance or opening of the door can be achieved while still maintaining some protection against entry.

Security chains commonly include means for mounting one end of the chain to a molding which circumscribes the door frame and a second mounting means having a slot or channel which is secured directly to the door. A member attached to the free end of the chain is adapted to be closely and securely received by the door mounting means. Thus, when one wishes to speak to a suspect caller, one merely secures the free end of the chain to the door mount and unlocks the door. The door can then be opened a distance regulated by the length of the security chain.

As law enforcement personnel know all to well, the fallacy of security chains is that they are inherently structurally weak. Very little force is necessary to break the links of a typical security chain due to their low tensile strength. Moreover, even an intruder of moderate build can very often ram a door with a sufficient force to pull the chain mounting means from their moorings, at times separating the door frame molding from underlying structures. Therefore, security chains are many times inadequate to prevent intrusion and may in fact give an occupant a false and fatal sense of security where none exists.

A solution to the problems inherent in security chains, one which still permits a door to be opened slightly to interrogate a caller, is the provision of a door stop member mounted directly to the floor of a room within the arc of passage of the door as it swings upon its hinges. In use, a door stop member is mounted on a floor bracket which is adapted to rigidly receive the stop member. One such device is disclosed in U.S. Pat. No. 3,833,963 to Waters. There, a door stop comprising a channeled floor plate and a stop member is disclosed. The plate is mounted in the floor surface such that the floor surface and the top of the plate lie in the same plane. In this mode the door is free to swing through its complete arc of passage. When the movement of the door is to be impeded, a separate component, the stop member, is inserted into the floor mount via its channels where it is then locked into place. While the concept is viable, the device is impractical due to its inconvenient method of operation.

Although appropriate as stop members, the devices disclosed in U.S. Pat. No. 4,601,502 to Van Dyke, U.S. Pat. No. 4,601,504 to Wolf and U.S. Pat. No. 4,462,623 to Grant all suffer from numerous drawbacks including their limited ability to withstand the substantial lateral forces which would be exerted on their stop rods or pins. Not only would the stop rods most likely bend if not formed of strengthened materials, their delicate and complicated spring actuating mechanisms may be irreparably-damaged in response to any significant force. Moreover, it is clear that in order to be operated conveniently with one's foot, the cross-sectional area of the telescopic rods would have to be extremely large. For these and other reasons, these pin-like devices are wholly impractical as sturdy door security devices.

A more realistic approach is disclosed in U.S. Pat. No. 3,805,322 to Serrano. There, unlike the aforementioned devices, a pivotable stop member is provided in a housing which is mounted in a floor cavity. In one mode of operation, the device is retracted within the floor cavity and in the second mode of operation, the pivotable stop member is raised above the floor surface to engage and thus stop the arcuate movement of the door. It is stated in Serrano that the device can be operated with one's foot. However, from close inspection, it is apparent that although it is possible to raise the stop member by the complicated process of turning a floor mounted serrated disc with one's foot, it is virtually impossible to lower the stop member without reaching down to the floor with one's hand to release a support strut. In fact, once the strut is released it is still necessary to once again turn the serrated disc precisely back to its initial position, requiring rotational movement against the opposing force of the biasing member. Further, the thin stop member, its precarious attachment to the housing, and the fragile support strut all combine to create far too many weak links for substantial safety against intrusion.

Many of these problems are resolved by the present inventor's development of the retractable door security device described in U.S. Pat. No. 4,797,970. Therein, there is provided a door security device which includes a housing which is mounted beneath a flat surface such as a floor. The housing is supported by a floor plate or flange which is mounted by screws of the like to the floor surface. A foot-operated stop member alternates between raised and lowered positions in response to a force exerted downward on the stop member by one's foot.

The door security device includes a novel latch mechanism mounted within the housing which is responsive to movement of the stop member by virtue of a camming surface and a catch release rod. The stop member is spring biased in a raised position and is held in the lowered position against this biasing force by a spring actuated plunger in sliding relation with a barrel. When the stop member is in the raised position the plunger is held within the barrel by a spring actuated catch mechanism.

The door security device is designed to be placed several inches from a door in the arc of passage. In the lowered position, the door can pass over the door security device without contacting the device. In the raised position, the passage of the door through its normal arc is impeded by contact with a door-engaging surface of the raised stop member. In order to improve the operation of the present inventor's patented door security device, an anti-lock-out mechanism has been devised. This improvement reduces the risk of accidental lock-out which could occur if the door passes over the raised stop member from the back. In other words, in some instances it is possible that the stop member could be raised while a door is in the open position. If the door is then closed without first lowering the stop member, the lower edge of the door moves along the upwardly inclined stop member surface creating a camming action which forces the stop member into the housing. If there is sufficient clearance between the lower edge of the door and the top of the security device housing, the door may complete its passage without fully depressing the stop member into the housing. As a result, the latching mechanism does not engage and once the door clears the stop member, the stop member returns to the fully raised position causing lock-out. It will be appreciated, then, that the prior device had only two positions, fully raised or fully lowered.

In addition, in order to prevent the unintentional release of the stop member from the lower position to the raised position, it was disclosed in the aforementioned U.S. patent that a separate closure plate with an optional lock could be provided to cover the stop member. Although this construction successfully prevents accidental release of the stop member, it requires the manufacture of a separate plate which can easily be misplaced by the user.

The present invention not only solves these limitations in the prior art, but also provides other useful improvements and adaptations of the retractable design.

These and other meritorious features and advantages of the present invention will be more fully described herein in connection with the description of the preferred embodiments and with reference to the drawings in which:

BRIEF DESCRIPTION OF THE DRAWINGS

FIG. 5 is a cross-sectional elevational view of the present invention which illustrates the retractable member in the fully raised position.

FIG. 6 is an exploded view of the latch and ratchet plate components of the present invention.

FIG. 7 is an exploded view of a sliding lock-down mechanism for use in the present invention.

DETAILED DESCRIPTION OF THE PREFERRED EMBODIMENTS

Figure 1:
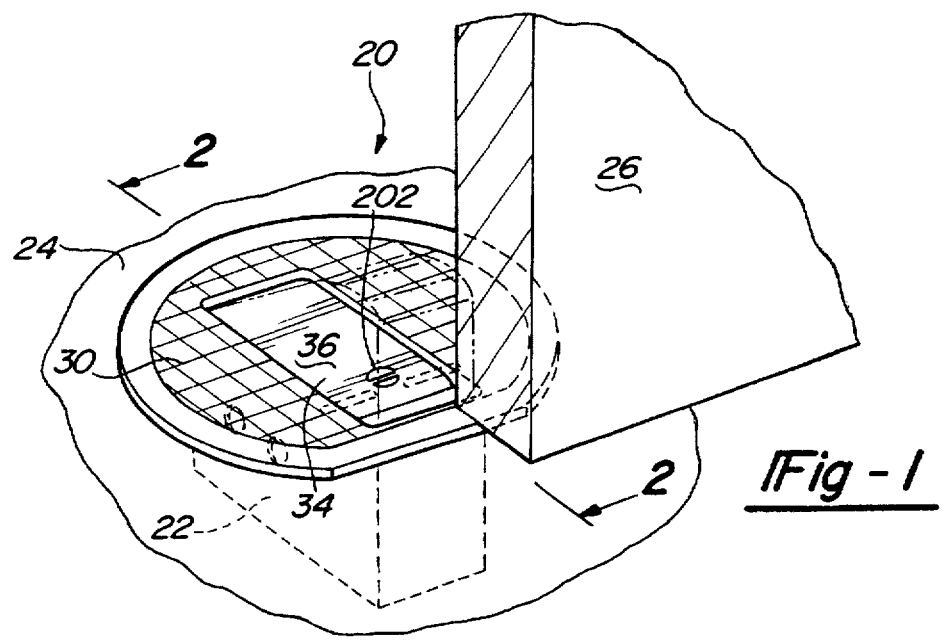
FIG. 1 is a perspective view of the present invention utilized as a door security device, the stop member being shown in both the lowered mode and the raised mode, the latter being shown in phantom.
Figure 2:
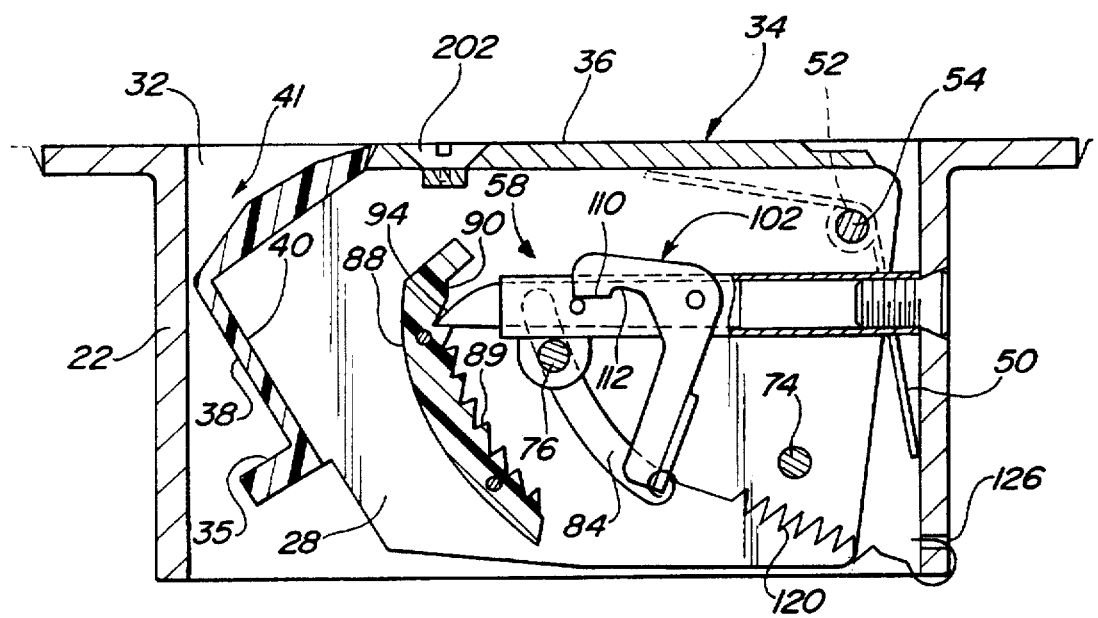
FIG. 2 is a cross-sectional elevational view of the present invention, illustrating the engagement of the ratchet plate by the latch plunger.

Referring now to the drawings, the present invention will be described in that embodiment in which the apparatus serves as a security device. With reference now to FIGS. 1 and 2 of the drawings, door security device 20 is shown generally having housing 22 (shown in phantom in FIG. 1) which extends below floor 24. Security device 20 is mounted relatively flush with the top surface of floor 24 so that door 26 can swing freely through its arc of passage across door security device 20 in one mode of operation. Accordingly, door security device 20 is mounted by inserting housing 22 through a corresponding opening in floor 24. Housing 22 defines a chamber 28 in which latching mechanism 58 is disposed.

Attached to and supporting housing 20 is floor plate 30 which is in the nature of a mounting flange or the like. Materials suitable for forming housing 22 and floor plate 30 are generally inexpensive formable metal such as steel with good strength characteristics and wearability. Other materials having these characteristics may be suitable or even desirable in a particular application.

Floor plate 30 and housing 22 are provided with an opening 32 which closely receives pivotal stop member 34 in both its retracted position and its raised position, the latter being shown in phantom. Pivotable or retractable stop member 34 includes principal surface 36, again being shown in both the raised and retracted positions in FIG. 1. Pivotable stop member 34 is provided with door-engaging surface 38. Door-engaging surface 38 engages door 26 in one mode of operation. In order to prevent door-engaging surface 38 from marring the door surface, rubber pad 40 is preferably provided which may be formed of any non-marking resilient material. Rubber pad 40 may be attached to stop member 34 in a number of acceptable manners such as through the use of screws or adhesives. Rubber pad 40 is provided with external camming surface 41 shown generally which has three angular faces 43, 45 and 47, the function of which will be more fully explained hereinafter. Stop member 34 includes ledge 35 which serves to reduce the accumulation of dirt in chamber 28. Mounting screws (not shown) are preferably provided which extend through floor plate 30 to attach door security device 20 to floor 24. The floor opening may be countersunk such that floor plate 30 is attached to a counter-sunk portion of floor 24 and an optional decorative cover plate may be provided on top of floor plate 30. It will generally be desired to have the top surface of security device 20 flush with the top surface of floor 24 when stop member 34 is in the retracted position. Stop member 34 is spring biased, preferably by a pair of springs one of which is shown as spring 50 in the drawings. Spring 50 has spring loop 52 which loops around stop member pivot axle or shaft 54. The springs may be retained by spring retaining screws (not shown).

Pivot axle 54 is preferably stationary with respect to housing 22 and extends through stop member 34 transversely. It is pivot axis 54 which allows stop member 34 to pivot between the raised and lowered positions. Spring 50 serves to bias stop member 34 in the raised position. Hence, as will be more fully explained, stop member 34 is restrained against the biasing force produced by spring 50 when stop member 34 is in the retracted position.

Figure 3:
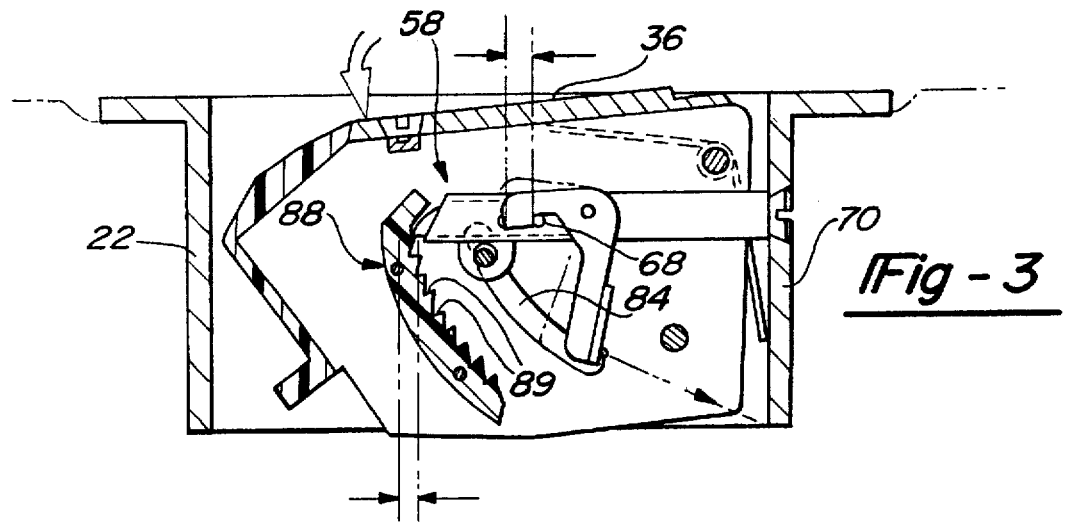
FIG. 3 is a cross-sectional elevational view of the present invention, illustrating the latch-releasing movement of the retractable member in response to an applied force.

Referring now specifically to FIGS. 3 and 6 of the drawings, latch mechanism 58 is shown having latch barrel 60 with slotted wall 62. In other words, wall 62 of latch barrel 60 is provided with slot 64 along with a corresponding slot on the opposite side of barrel 60 in an opposed fashion. Closely received within latch barrel 60 is latch plunger 66 in a piston/cylinder-like configuration. Although the outer surface of plunger 66 is in substantial contact with the inner surface of latch barrel 60, they are in sliding contact so that latch rod 66 can easily move partially in and out of latch barrel 60. Latch rod or plunger 66 is provided with opposed latch rod pins 68 which are shown here as one structure extending through plunger 66 at hole 67. It may be suitable to simply form each pin 68 on the outer surface of plunger 66. Opposed latch rod pins 68 serve as the means by which plunger 66 is retained in one position in barrel 60 during one mode of operation. Barrel 60 is secured to wall 70 of housing 22 with the use of barrel retaining screw 72. That end of barrel 60 which abuts wall 70 is threaded to receive screw 72. Stop member 34 further includes catch release rod or bar 74 which provides added strength to stop member 22 and which serves as a catch release which will be more fully explained. In order to support the end of barrel 60, opposite the end mounted to wall 70, there is provided support post 76 spanning the side walls of housing 22. In this respect, and referring now to FIGS. 2, 3 and 4, on each side wall of stop member 34 an arcuate slot 84 is provided which is positioned relative to support post 76 such that as stop member 34 moves between the raised and retracted positions, the arcuate slots provide clearance for support posts 76.

As shown in FIG. 3 of the drawings, stop member 34 preferably includes arcuate ratchet plate 88 having a series of teeth 89 and a camming face 90. Camming face 90 and teeth 89 are beveled at an angle corresponding to beveled camming rod end 96 so that the two form mating camming surfaces. As will be seen, the movement of stop member 34 from the projective or raised position to the lowered or retracted position causes rod end 96 to move along teeth 89 such that plunger 66 is forced to move deeper within barrel 60. As plunger 66 slides across camming face 90 it becomes locked within barrel 60 in the manner more fully described hereinafter. This movement is against the biasing force of helical spring 97 which is compressed within barrel 60 between screw 72 and spring engaging end 98 of plunger 66. The strength or biasing force of helical spring 97 as well as spring 52 is dictated by the desired ease of operation. They should, however, be strong enough to provide good action by the parts which they bias consistent with the objective of the present invention.

Figure 4:
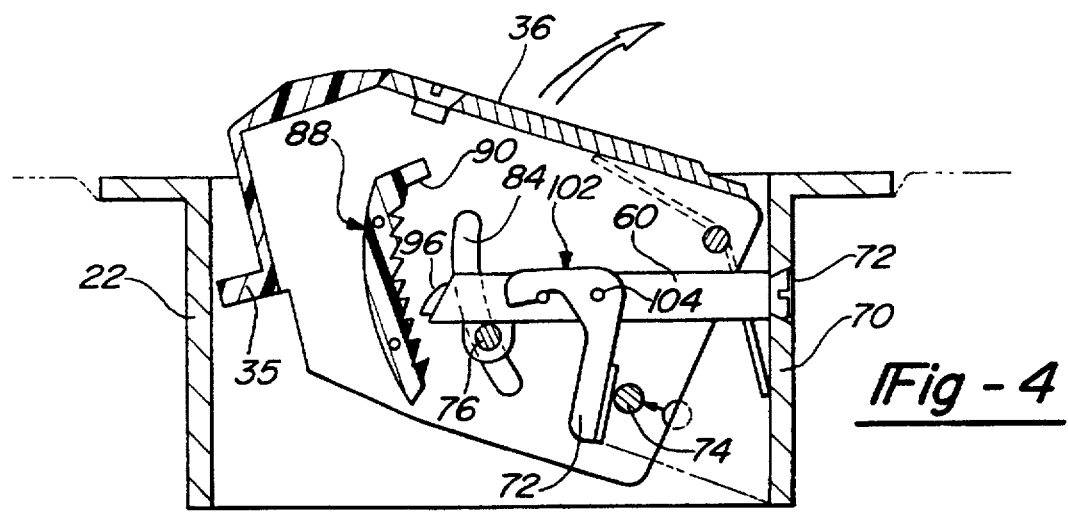
FIG. 4 is a cross-sectional elevational view of the present invention which illustrates movement of the retractable member into the open position.

Referring now to FIGS. 2 and 4, pivotable latch rod catch 102 is provided which pivots with respect to barrel 60 on pivot pin or axle 104 that extends through hole 61. Pivot pin 104 is preferably rigidly attached to leg 106 and leg 108 of catch 102 with pin or axle 104 in substantially free rotation with respect to barrel 60 and plunger 66 as will be more fully described. Each leg, 106, 108 is provided with pin engagement surfaces 110 and pin retaining notches 112. Cross member 114 is provided to provide added strength to catch 102 and for providing a space to create spring attachment hole 116 shown in FIG. 6.

As can be seen in FIGS. 3 through 5, catch 102 pivots between a first position in which pin engagement surfaces 110 ride on latch rod pins 68 and a second position in which latch rod pins 68 are retained within pin retaining notches 112. The movement of pin 68 as plunger 66 is forced deeper into barrel 60 causes pin engagement surfaces 110 to ride upon pin 68 as shown best in FIG. 2.

Spring 120 is provided, extending from hole 116 to hole 126. Spring 120 serves to bias catch 102 until catch 102 engages pins 68 in retaining notches 112 as plunger 66 moves deeper into barrel 60.

Referring now to FIG. 6, the beveled nature of end 128 of barrel 60 is seen which provides good clearance with ratchet 88 during operation as shown in FIG. 3. As seen in FIG. 6, not only are slots 64 provided in barrel 60 which provide clearance for pins 68 during the movement of plunger 66, plunger 66 is provided with a slot or channel 130 for clearance with catch pivot pin 104. In other words, channel 130 allows plunger 66 to move freely without being impeded by catch pivot pin 104. Again, it is preferred that all of the components be made of metal or another hard, durable material, possibly some plastics, to provide strength and durability.

In operation, and referring now to FIG. 1 of the drawings, as door 26 is opened with stop member 34 in the retracted position, door 26 freely moves through its arc of passage and across door security device 20 in an unrestricted fashion. In this retracted mode, and as best seen in FIG. 2 of the drawings, stop member 34 is held within housing 22 against the bias of spring 50 by the engagement of end 96 of plunger 66 on the first tooth 94 of ratchet 88. Plunger 66 is biased by virtue of the force of helical spring 97. Plunger 66 is allowed this freedom because catch 102 in this mode of operation does not retain plunger 66 within barrel 60; rather, pin engagement surfaces 110 of catch 102 ride on pins 68 as shown.

In order to release stop member 34 to the raised position shown in FIGS. 1 (in phantom) and 5, a vertical or downward force is applied to principal surface 36 of stop member 34 to move stop member 34 down within housing 22 as shown in FIG. 3. As this downward movement occurs, the camming action of camming surface 90 on plunger end 96 forces plunger 66 to move rearwardly, deeper into barrel 60. Pins 68 on which pin engagement surfaces 110 were riding in FIG. 2, now move backward where they are captured in retaining notches 112 due to the configuration of notches 112 and the biasing force of spring 120 on catch 102. That is, once pins 68 reach a certain position on pin engagement surfaces 110, the biasing force of spring 120 on catch 102 causes catch 102 to pivot forward by virtue of pivot pin 104 to the position shown in FIGS. 3 and 4. Plunger 66 is thus retained in barrel 60 with sufficient clearance between end 96 and ratchet plate 88 such that spring 50 is now free to spring stop member 22 into the raised or projective position shown in FIGS. 1 and 5. In this position, as door 26 begins to move through its arc of passage, it encounters door engaging surface 38 of stop member 34, whereby the movement of door 26 is successfully impeded. Due the strength of door security device 20, it is virtually impossible to open door 26 without completely destroying the door.

As stop member 34 rises into the raised or projective position out of housing 22 as shown in FIG. 5, stop member 34 pivots on pivot axle 54. This pivoting motion of stop member 34 causes catch release bar 74 to move toward catch 102 as best shown in FIG. 4. In FIG. 4 catch release bar 74 is shown in an intermediate position during the pivoting of stop member 34 in contact with legs 106 and 108. It is important that the biasing force of spring 50 be sufficient to counteract the biasing force of spring 120 such that stop member 34 can raise completely while simultaneously rotating catch 102 on pivot pin 104. In other words, as stop member 34 moves into the raised position, catch release rod 74 strikes catch 102 below pivot pin 104, causing catch 102 to release pins 68 from pin retaining notches 112. As pin retaining notches 112 release pins 68, plunger 66 is ejected in response to the biasing force of spring 97 into its extended position. It will now be understood that as stop member 34 rises, latch mechanism 58 is reset and is then prepared to retain stop member 34 when it is lowered by one's foot to its flush position.

Referring now to the anti-lock-out feature of the present invention with reference to FIG. 5 of the drawings, in the event that door 26 moves in the direction of arrow A when stop member 34 is in the fully raised position as shown, door 6 produces a camming action along inclined surface 36 of stop member 34 tending to move stop member 34 down into housing 22 in the direction of Arrow B. As stated, in the prior art device, if stop member 34 did not move a distance sufficient to lock into the fully retracted position, stop member 34 would pop up after the door was closed causing accidental lock-out. Accordingly, ratchet plate 88 prevents accidental lock-out in the following manner. As door 26 moves along surface 36 forcing stop member 34 to move in the direction of Arrow B, plunger 96 advances along teeth 89 of ratchet plate 88 sequentially. Thus, for example if door 26 clears stop member 34 and only partially forces stop member 34 into housing 22, stop member 34 is not spring biased back into the fully raised position because end 96 of plunger 66 retains stop member 34 in the partially lowered position via the engagement of end 96 with one of teeth 89 of ratchet plate 88. Not until and only after stop member 34 is sufficiently depressed in housing 22 such that end 96 cams along camming surface 90 of ratchet plate 88 does catch 102 lock plunger 66 in barrel 60, allowing stop member 34 to spring into the fully raised position.

In addition, in some instances the engagement of end 96 of plunger 66 with teeth 89 may allow stop member 34 to move slightly into a higher position after door 26 has crossed surface 36 in the direction of Arrow A. By providing external camming surface 41 on pad 40, as the door 26 is reopened the lower edge of door 26 moves along camming surface 41 to lower stop member 34, thereby compensating for any slight pop up movement despite the inventive ratchet engagement technique.

Referring now to FIGS. 2 and 7 of the invention, inadvertent release of stop member 34 into the raised position may be prevented through lock mechanism 100 which in this embodiment comprises a turn screw 202 having posts 104 and 106 that are connected to sliding arms 108 and 110 at post receiving holes 112 and 114. As turn screw 202 is rotated, arms 108 and 110 slide in and out of slots 116 and 117 (only one each shown for simplicity) in the side walls of stop member 34 and housing 22 respectively such that the movement of stop member 34 into the raised position is prevented. Corresponding slots (not shown) are provided on the opposite side walls. Lock mechanism 100 may include a key lock.

Figure 8:
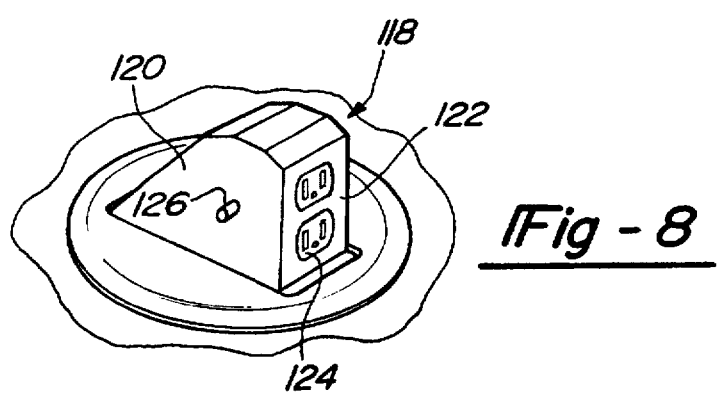
FIG. 8 is a perspective view of the present invention as adapted for use as a hideaway electrical outlet.

In still another embodiment of the present invention, hideaway utility box 118 is provided as shown in FIG. 8 of the drawings. The construction and operation of hideaway utility box 118 is preferably the same as security device 20; however, retractable member 120 is provided with mounting face 122 in which a receptacle is mounted, shown here as a pair of electrical outlets 124. In order to prevent retractable member 128 from being inadvertently closed during use which could damage the outlets and items plugged into the outlets, a pair of spring biased plungers 126 (one shown for convenience) are provided which are depressed when retractable member 120 is moved into the lowered positions and which automatically extend once retractable member 128 reaches the raised position. This safety feature can be configured in a number of manners.

Although not intended to be an exhaustive list of potential utility connections or devices to be mounted in face 122, it is contemplated that the present invention will be useful for providing electrical outlets, telephone outlets, including fax and computer modem outlets, and water and gas outlets and combination thereof. In addition, sensors such as pressure or force sensors, optical sensors (for example two opposed units with corresponding photo sensors may be placed in front of art objects or the like), acoustic sensors and light source may be suitable in a particular application. For example a pressure sensor in association with pad 40 may be linked (either hand-wired or remotely) to a security alarm or station to detect movement of door 26. A light source, such as a blinking red light, may be used to guide persons through smoke or in the dark in an emergency. In a marina, restricted access to electricity may be easily provided with the present invention with a lock feature. Of course it is to be understood that combinations of these outlets and sensors may also be desired in a given application.

As a security device, device 20 should be placed within inches of a door such that the door can be opened only fractionally when security device 20 is in the raised position, thus preventing an intruder from reaching through the door opening to lower the device. It will be appreciated that stop member 34 cannot be lowered while engaging the door, since stop member 34 moves forward slightly during its pivoting patch into the lowered position. Also, a spacer such as a hollow wedge over stop member 34 or a spacer attached to the door (not shown) can be provided between the door and door engaging surface 38 of stop member 34 such that door security device 20 can be used to secure a door 26 in its normal closed position. Alternatively, security device 20 can be used simply to hold a door open as desired. Many other applications will be known to those skilled in the art, one of which may include use in sliding doors with track mechanisms, for example, patio doors. In this use, corresponding grooves can be provided in the top of device 20. Device 20 may be used in any application where a security lock or safety stop is required such as with traveling machinery. It may also be possible to automate door device 20 such that it can be operated remotely. For example, a solenoid or other electronic device could be included in latch mechanism 58 so that stop member 34 can be activated from a remote position such as outside door 26 by a combination lock, a key or through computer control.

While a particular embodiment of this invention is shown and described herein, it will be understood of course, that the invention is not to be limited thereto since many modifications may be made, particularly by those skilled in the art, in light of this disclosure. It is contemplated therefore by the appended claims to cover any such modification as fall within the true spirit and scope of this invention.

What is claimed is:

1. A spring biased retractable apparatus mounted in a flat surface such as a floor or wall and having raised and lowered positions, said apparatus further having dual lockout resistance, said apparatus comprising:

a housing having an opening to receive a retractable member;

a spring biased retractable member disposed in said opening, said spring biased retractable member having a top surface substantially coplanar with said flat surface in which said apparatus is mounted when said apparatus is in said closed position, said spring biased retractable member having an engagement surface for engaging and impeding the movement of an object, said surface for engaging said object having a camming surface for lowering said retractable member by engaging said object, wherein said camming surface and said top surface of said spring biased retractable member form a single uninterrupted surface;

a ratchet plate in association with said retractable member, said ratchet plate having a series of teeth mounted to form an arc of teeth wherein said ratchet plate and said retractable member are moveable relative to said housing;

a latch mechanism in association with said housing, said latch mechanism having a spring biased plunger which sequentially engages surfaces of said teeth of said ratchet plate and which follows said arc of said teeth to retain said retractable member in a plurality of indexed positions relative to said housing, said plunger having a camming surface which interacts with said ratchet to incrementally move said plunger.

2. The spring biased retractable apparatus recited in claim 1, wherein said apparatus is a security door stop and wherein said engagement surface is a door engaging surface of said retractable member.

3. The spring biased apparatus of claim 1 further including locking means for locking said retractable member in said lower position in said housing to prevent accidental release of said retractable member to the raised position.

4. A device mounted in a flat surface such as a floor or wall and having a dual lockout resistance, said device for engaging and impeding the movement of an object, comprising:

a retractable stop member having a top surface substantially copy with said flat surface in which said apparatus is mounted when said apparatus is in said closed position and said spring biased retractable member having a surface for engaging an object, the movement of which is to be impeded, said retractable stop member having a camming surface for lowering said stop member by engaging said object, wherein said camming surface and said top surface of said spring biased retractable member form a single uninterrupted surface;

a ratchet plate in association with said stop member, said ratchet plate having a series of teeth mounted to form an arc of teeth;

a housing having an opening to receive said stop member, wherein said stop member and said ratchet plate can pivot relative to said housing; and a latching mechanism in association with said housing, said latching mechanism having a spring biased plunger which sequentially engages said teeth of said ratchet plate and which follows said arc of teeth to retain said stop member in a plurality of indexed positions relative to said housing, and wherein said end of said plunger is beveled.

5. The device recited in claim 4, wherein said latching mechanism further includes a barrel wherein said plunger is spring biased in said barrel.

6. The device recited in claim 5, wherein one end of said barrel is attached to said housing and the other end of said barrel is beveled.

7. The device recited in claim 5, wherein said stop member is biased by a spring.

8. The device recited in claim 5, wherein said latching mechanism includes a pivotable catch which is spring biased.

9. The device recited in claim 5, wherein said device is constructed of a material selected from the group consisting of metal and hard plastic.

10. The device recited in claim 5, wherein said stop member includes a projection defining a ledge.

11. The invention recited in claim 1, wherein said retractable member further includes a utility receptacle.

12. The invention recited in claim 1, wherein said retractable member further includes a sensor.

* * * * *

UNITED STATES PATENT AND TRADEMARK OFFICE
CERTIFICATE OF CORRECTION

PATENT NO. : 5,775,746
DATED : July 7, 1998
INVENTOR(S) : John Charlton

It is certified that error appears in the above-indentified patent and that said Letters Patent is hereby corrected as shown below:

Column 9, line 37, delete "copy" and insert --coplanar--.

Signed and Sealed this

Tenth Day of November 1998

Attest:

Attesting Officer

BRUCE LEHMAN

Commissioner of Patents and Trademarks